United States Patent [19]

Ito

[11] Patent Number: 5,223,894
[45] Date of Patent: Jun. 29, 1993

[54] CONTROLLING APPARATUS OF A COPYING MACHINE HAVING PLURAL MEMORY AREAS

[75] Inventor: Masazumi Ito, Toyohashi, Japan

[73] Assignee: Minolta Camera Kabushiki Kaisha, Osaka, Japan

[21] Appl. No.: 760,345

[22] Filed: Sep. 16, 1991

[30] Foreign Application Priority Data

Sep. 17, 1990 [JP] Japan ................... 2-248539

[51] Int. Cl.⁵ .................................. G03G 15/00
[52] U.S. Cl. ..................... 355/203; 355/209; 364/400
[58] Field of Search .......... 364/400, 401–408; 341/106; 355/203, 204, 205, 206, 207, 208, 209

[56] References Cited

U.S. PATENT DOCUMENTS

| | | | |
|---|---|---|---|
| 4,016,549 | 4/1977 | Hutner | 364/926.8 X |
| 4,475,221 | 11/1984 | Kawamura et al. | 377/13 |
| 4,604,696 | 8/1986 | Suganama et al. | 364/401 |
| 4,868,570 | 9/1989 | Davis | 341/106 |
| 5,014,327 | 5/1991 | Potter et al. | 382/14 |
| 5,034,804 | 7/1991 | Sasaki et al. | 358/41 |

Primary Examiner—A. T. Grimley
Assistant Examiner—Thu Dang
Attorney, Agent, or Firm—Burns, Doane, Swecker & Mathis

[57] ABSTRACT

This controlling apparatus of copying machine is connected to a copying machine used in common among a plurality of individuals or groups, and adapted to cumulate and display the copying numbers of papers for every individual or group. The controlling apparatus enables classification of the plurality of individuals or groups into an arbitrary unit of individuals or groups in a predetermined manner, whereby the copying number of papers obtained by each classified unit can be summed and displayed. Moreover, the controlling apparatus gives permission to the copying machine when the copying machine is to be used.

27 Claims, 14 Drawing Sheets

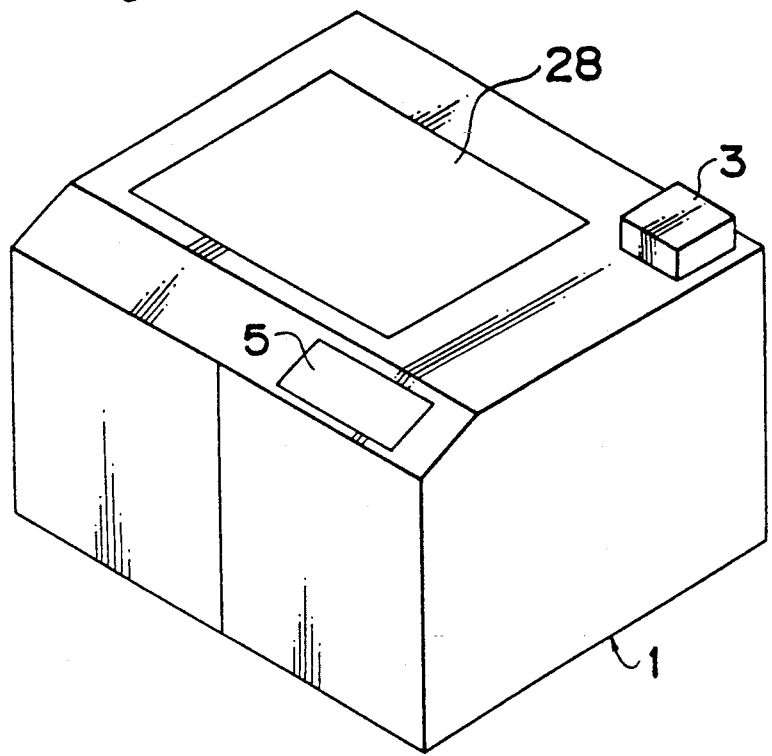
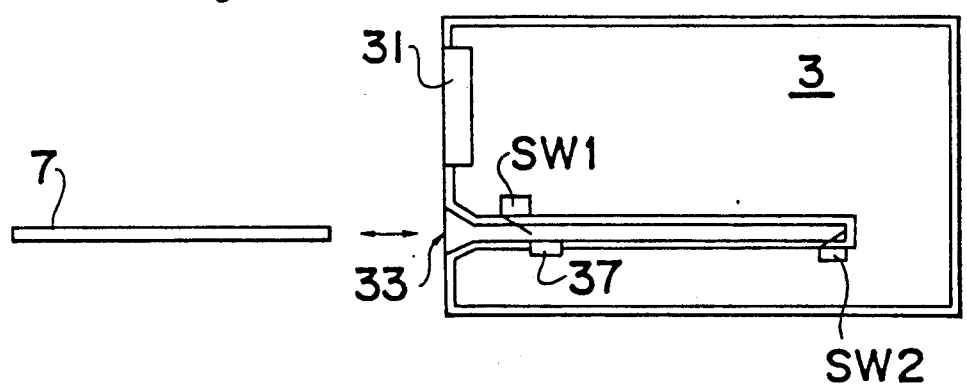

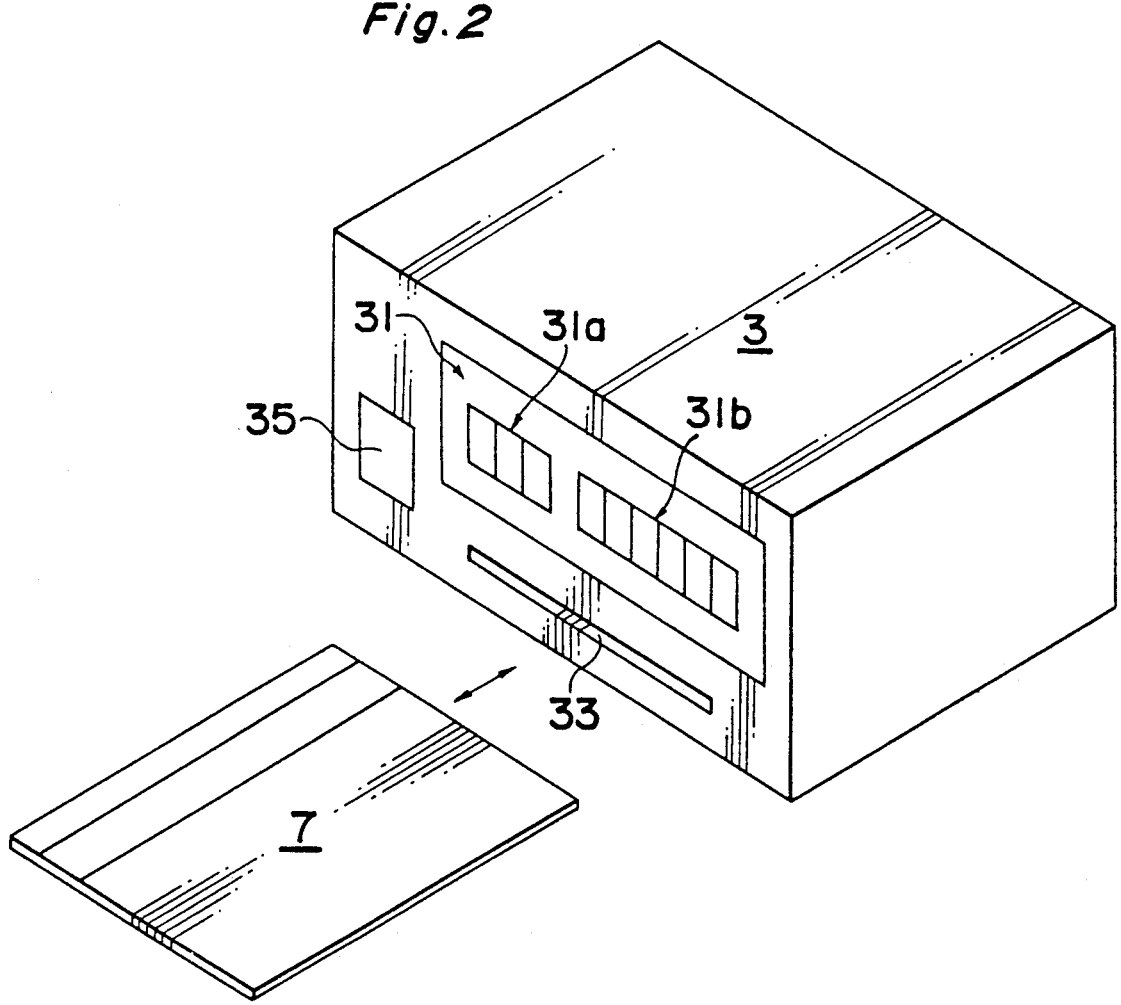

ically change the
constitution of a unit element as the basis for calculation
of the copying number of sheets, and obtains the sum of
the copying numbers in unit elements according to
different kinds of classifications.
CONTROLLING APPARATUS OF A COPYING MACHINE HAVING PLURAL MEMORY AREAS

BACKGROUND OF THE INVENTION

1. Field of the Invention

The present invention relates to a controlling apparatus of copying machine having a function to store the copying number of papers per unit element (minimum unit as the basis for calculation of copying charges or the like, e.g., department, section, or individual person within a company).

2. Description of the Prior Art

The applicant of the present invention has provided a controlling apparatus connected to a copying machine when in use, which has a function to count and store the copying number of sheets per every unit element and to display (output) the same upon necessities.

According to the above apparatus, copying is started by setting a magnetic card named as an element card. The copying number in the state set by the magnetic card is stored in correspondence to each element. Therefore, it is possible to know the copying number of sheets per unit element, and calculate the charges for every unit element.

An apparatus with the same function as above is disclosed also in published specifications of Japanese Patent Laid-open Publication (unexamined) No. 54-72057 and Japanese Utility Model Publication (examined) No. 1-21312.

In some cases, it sometimes becomes necessary to find the total copying number of each department or section, etc. in order to make a budget for each of them which use the same copying machine in common. In such circumstances as above, the controlling apparatus of the aforementioned type has been brought in the market.

Moreover, it may be required to find the total copying number for a group consisted by a plurality of departments or sections.

For example, supposing that there are the first through fifth sections in the patent department and the first through third sections in the development department, that is, eight sections in total, the sum of the copying sheets either in the group formed of the five sections of the patent department or that formed of three sections of the development department may be sometimes necessitated.

In this case, it would be possible to obtain necessary data by summing manually the copying numbers stored for every section. However, this method wastes time and labor.

In another way, although the total copying number of the patent department can be made clear if it is arranged beforehand that the patent department be considered as a single unit element, it is not possible to know the copying number of each individual section in the patent department. This method is further disadvantageous in that it does not meet the case where a plurality of sections included in the unit element are to be changed, or a plurality of different kinds of sections, i.e., organizations are to be included in a unit element.

Given that the above-described first through third sections in the patent department handle patents related to agricultural machinery, the fourth and fifth sections in the patent department handling patents related to small ships, while the first section in the development department makes research and development of agricultural machinery, with the second and third sections in the development department handling small ships, the above method is not fit for obtaining both of the sum of the copying number of the whole of the patent department (first through fifth sections) and the sum of the copying number of the whole of the group handling the agricultural machinery (that is, first through third sections in the patent department and first section in the development department).

SUMMARY OF THE INVENTION

The object of the present invention is therefore to provide a controlling apparatus of copying machine, with a view to substantially solving the above-described disadvantages, which is adapted to arbitrary change the constitution of a unit element as the basis for calculation of the copying number of sheets, and obtains the sum of the copying numbers in unit elements according to different kinds of classifications.

In order to achieve the aforementioned object, the controlling apparatus of copying machine according to the present invention is used in the connected state with a copying machine. The controlling apparatus comprises memory means, data classifying means, memory control means and data outputting means. The memory means has memory areas corresponding to respective unit elements which are the units of the users of the copying machine. The memory means stores data representing a group and data of a classification specifying the group in correspondence to each other. The data classifying means inputs the data of the group to which each unit element belongs in correspondence to the classification specifying the group for every classification. The memory control means designates an arbitrary classification and an arbitrary group in the groups specified by the arbitrary classification. The memory control means discriminates the unit element every time the copying machine is used thereby to add and store the copying number of papers to the copying number stored in the memory area corresponding to the unit element. The data outputting means cumulates and outputs the copying numbers stored in each memory area corresponding to each element belonging to the arbitrarily designated group.

The above-described group to which each element belongs, and the classification specifying the group are, for example, as follows in the example described earlier:

Group:
- the whole of the patent department,
- the whole of the development department,
- the whole of the organization handling the agricultural machinery, and
- the whole of the organization handling the small ships;

Classification:
- classification by functions (either patent or development), and
- classification by handling objects (either agricultural machinery or small ships).

In other words, there are "the whole of the patent department" and "the whole of the development department" for the groups specified according to the classification by functions, and "the whole of the organization handling the agricultural machinery" and "the whole of the organization handling the small ships" in the groups specified according to the classification by handling objects.

It is to be noted here that the number of classifications specifying the group may be arbitrary although it is "2" in the present invention.

In order to input the group and the classification, numerical codes representing the group and the classification can be used, for example. It is not restricted to manual input through a key switch of the copying machine or controlling apparatus, but it may be possible to use a memory medium such as an IC card or a magnetic card.

Moreover, with respect to the system for outputting the counted copying number, the number may be indicated on a display or printed out on a paper or outputted in any other method.

In the controlling apparatus of copying machine of the present invention, every time copying is performed, the copying number of papers obtained by the organization (element) using the copying machine is counted, so that the latest copying number is stored for every organization.

Classifications and, groups specified by the classifications the aimed organization belongs to are inputted and stored respectively for each organization and for each classification. Therefore, if a desired classification and a desired organization in the group specified by the desired classification are respectively designated, the copying numbers of each organization belonging to the desired group are cumulated, and the total value is indicated, for example, on a display.

According to the present invention, it becomes possible to sum the copying numbers of each organization in any combination of the organizations, thereby increasing the degree of summing freedom without taking labor.

Besides, the controlling apparatus of the present invention enables free setting of a plurality of classifications.

Further, the controlling apparatus of the present invention may control not only the data of copying number of papers, but also the data of toner consumption.

More further, each memory area of the memory means may be assigned to each user, and also a plurality of memory areas may be assigned to each user. Besides, each memory area may be assigned to each paper size or each color of toner.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIG. 1 is a perspective view schematically showing an outer appearance of a copying machine and a controlling apparatus of copying machine according to the present invention;

FIG. 2 is a perspective view schematically showing the controlling apparatus of copying machine and a magnetic card;

FIG. 3 is a view explanatory of the mechanism of the controlling apparatus of copying machine;

DETAILED DESCRIPTION OF THE PREFERRED EMBODIMENT

Figure 4:
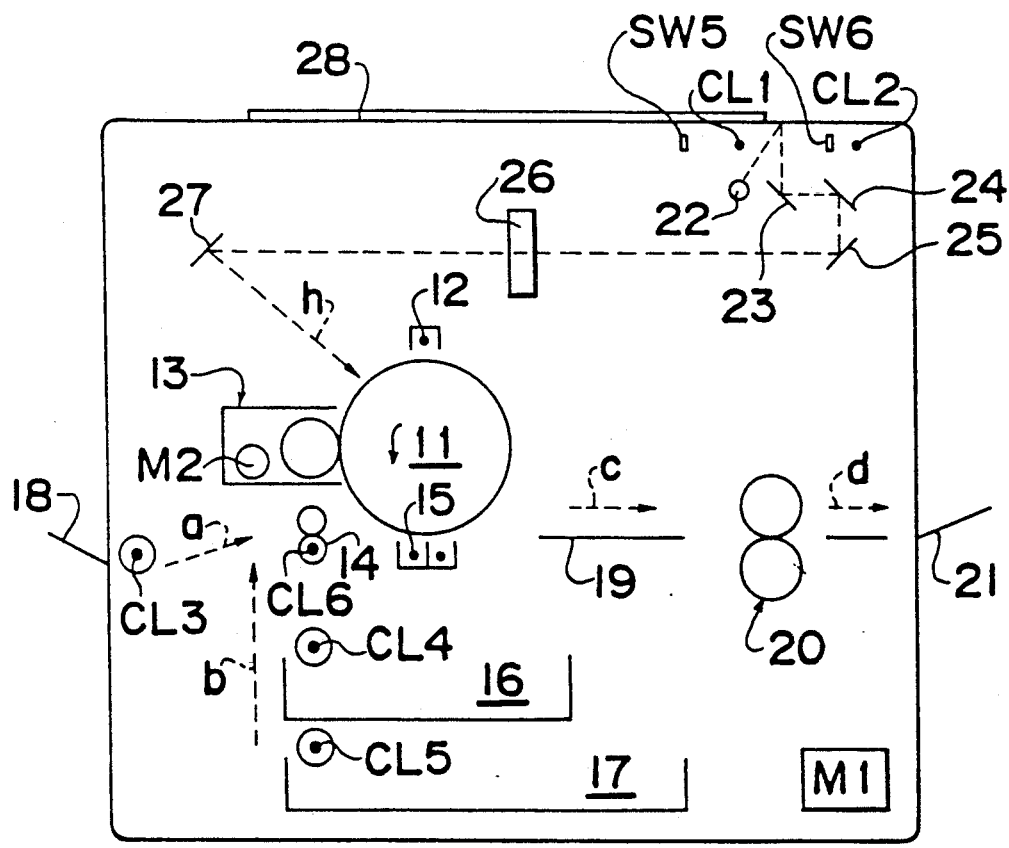
FIG. 4 is a view explanatory of the mechanism of the copying machine.

A controlling apparatus of copying machine according to one preferred embodiment of the present invention will be described hereinbelow.

<Structure as a whole>

As shown in FIG. 1, a controlling apparatus 3 of the present invention is mounted on the upper surface of a copying machine 1 in the right back of a document glass 28.

Referring to FIG. 2, at the front face of the controlling apparatus 3, there is provided a display unit 31 comprised of a three-digit numerical display part 31a and a six-digit numerical display part 31b. Moreover, a push button switch 35 is provided there for a predetermined instruction by the user. An opening 33 below the display unit 31 is a slit for inserting a magnetic card 7. When the magnetic card 7 is started to be inserted, it is detected since a switch SW1 of FIG. 3 is turned ON. When the insertion is finished, a switch SW2 is turned ON. Similarly, it is detected that the magnetic card 7 is started to be pulled out when the switch SW2 is turned OFF, and that the magnetic card 7 is completely pulled out when the switch SW1 is turned OFF.

In the controlling apparatus 3 of copying machine, when the magnetic card 7 is inserted, a head 37 reads data stored in the magnetic card 7 (referring to S517 in FIG. 6), thereby permitting copying in accordance with the kind of the magnetic card 7 or outputting to make various kinds of displays, etc.

There are such kinds of the magnetic card 7 as an element card (referred to as an E-card hereinafter), a total card (referred to as a T-card hereinafter) or a class setting card (referred to as a C.S-card).

Figure 14:
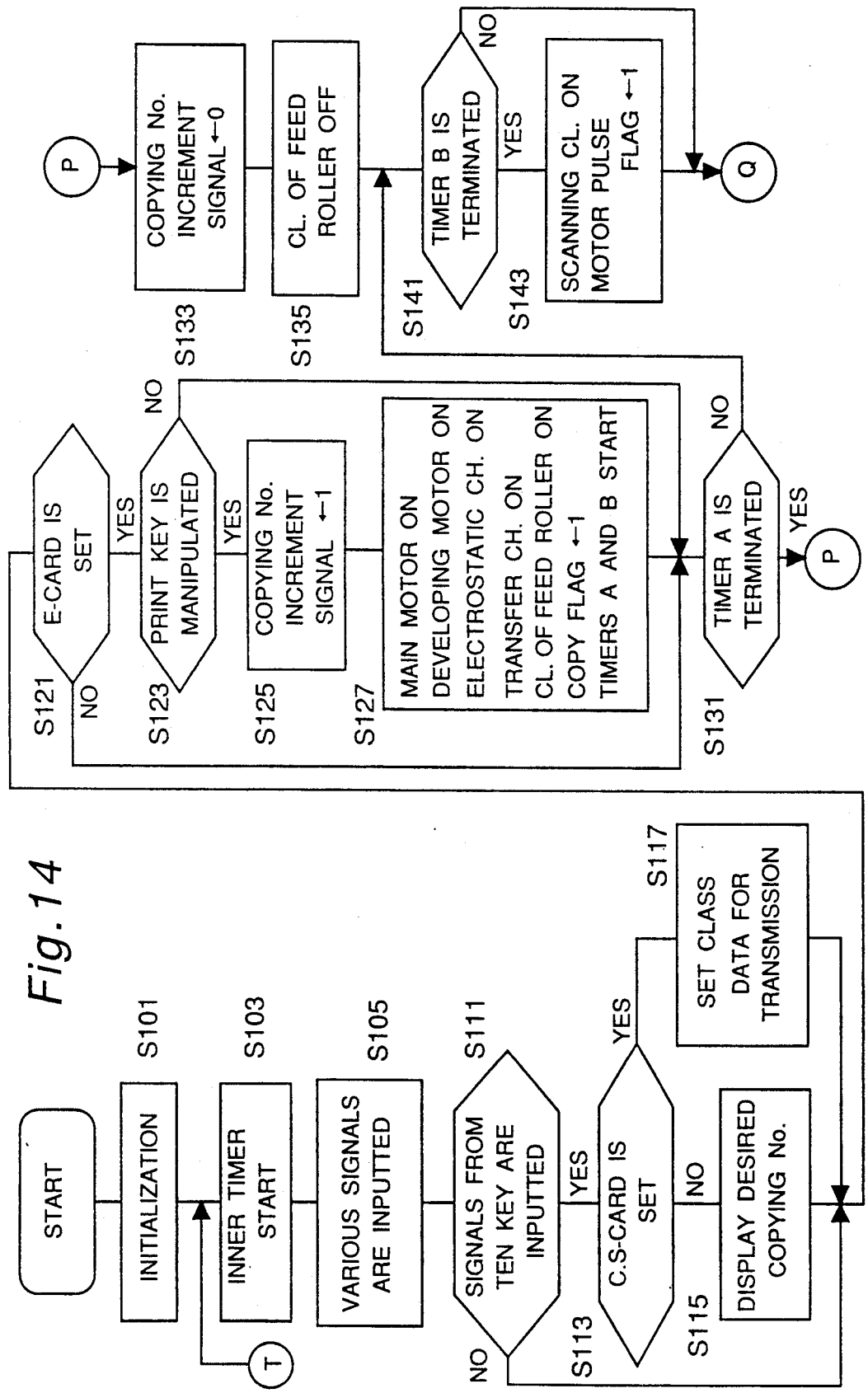
FIGS. 14–15 are flow charts showing a main routine of the process in the CPU of the copying machine.

The E-card is issued for every unit organization, e.g., a section or the like or for every person equivalent to a unit element, functioning as a key counter to permit operation of the copying machine 1 (referring to S121 in FIG. 14). When the E-card is set in the controlling apparatus 3, an element number proper to the subject organization as well as the copying number of sheets already copied by the organization is indicated at the display unit 31. Moreover, the copying number per every size of sheets of the organization can be indicated through a predetermined manipulation.

The T-card is used to read the total copying number of the copying machine, the copying number of every individual organization of all the organizations or the like, i.e., the T-card is used to read total data from a RAM 42 (referring to FIG. 5) of the controlling apparatus 3 and display the same at the display unit 31. When the T-card is set in the controlling apparatus 3, after a predetermined manipulation, not only the total data per every organization, but the total data per every group in the whole class can be indicated. The "class" referred to here is a concept corresponding to the "classification" mentioned earlier. A proper numerical value (class) is assigned to each classification. The T-card is used also to erase the data in RAM 42.

In the meantime, the C.S-card is a card for use in assigning an arbitrary "class data (numerical code)" corresponding to each element included in the group classified according to an arbitrary classification. This "class data" corresponds to the data to indicate one "group" classified according to the classification. In other words, a proper "class data" is assigned to each "group". If an arbitrary numerical data is inputted through a ten key on an operating panel 5 of the copying machine 1 while an arbitrary element number is displayed, the numerical data is set as the "class data" representing the group the subject element belongs to.

<Structure of copying machine 1>

FIG. 4 illustrates the mechanical structure of the copying machine 1 controlled by the controlling apparatus 3.

The copying machine 1 is an electrophotographic copying machine. More specifically, a document set in the document glass 28 is illuminated by an exposure lamp 22 at the exposing and scanning time. The reflecting light from the document is, passing through mirrors 23, 24, 25, a lens 26 and a mirror 27, guided to a photosensitive drum 11 along a path shown by a broken arrow h. As a result, an image of the document is formed on the surface of the drum 11.

The photosensitive drum 11 is uniformly charged by an electrostatic charger 12 at a point before the image is formed. Therefore, consequent to the above image formation, an electrostatic latent image corresponding to the amount of the reflecting light is formed on the surface of the photosensitive drum 11.

The electrostatic latent image is, after being developed into a toner image by a developer 13, transferred onto a paper fed with a predetermined timing between a transfer charger 15 and the photosensitive drum 11. The paper after the transfer of the toner image is carried to a fixing device 20 from a carrier belt 19 along a path shown by a broken arrow c, and, discharged to a discharge tray 21 outside the machine along a path indicated by a broken arrow b.

The paper is taken out from a manual feed port 18 when a clutch CL3 of a feed roller is turned ON, or from a paper tray 16 or 17 respectively when a clutch CL4 or CL5 is turned ON. Subsequently, the paper is fed to a timing roller 14 along a path shown by a broken arrow a or b, and stopped there temporarily.

Thereafter, a scanning optical system performs exposure and scanning to a predetermined position, whereby a timing switch SW5 is turned ON. Further, a clutch CL6 of the timing roller 14 is brought into the ON state. Accordingly, the paper stopped at the timing roller 14 is sent between the photosensitive drum 11 and transfer charger 15 to be subjected to the transfer process. Because of this sequence of operations, an end of an image to be formed on the paper matches an end of the document image.

A scanning body of the scanning optical system is comprised of a first scanning member having the exposure lamp 22 and mirror 23 mounted thereon and a second scanning member having the mirrors 24, 25 mounted thereon. When the scanning body is at a fixed position, it is detected by a fixed position switch SW6. CL1 is a clutch to transmit the driving and scanning force to the scanning body, while CL2 is a returning clutch to transmit the driving force to the scanning body thereby to return the same. M1 is a main motor and M2 is a developing motor. The rotation of the main motor M1 is detected by a pulse disc (not shown).

<Structure of control circuit>

Figure 5:
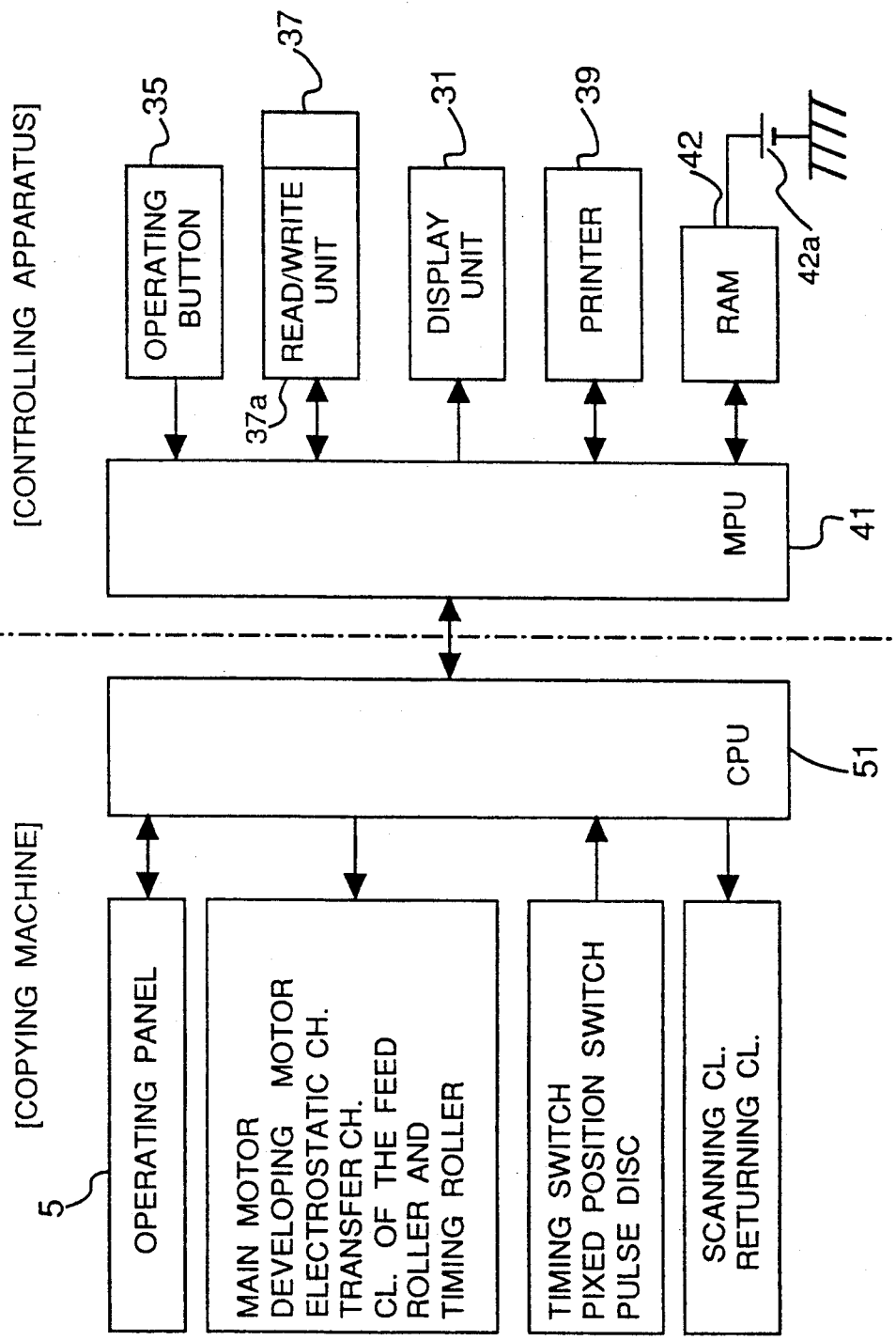
FIG. 5 is a block diagram of a control circuit of the copying machine and the controlling apparatus of copying machine.

FIG. 5 is a structural block diagram of a control circuit of the copying machine 1 and controlling apparatus 3.

The copying machine 1 is controlled by CPU51. Signals from various key switches on the operating panel 5, timing switch SW5 and fixed position switch SW6 provided within the copying machine 1, or from the pulse disc, etc. are inputted to CPU51. On the other hand, control signals are outputted from CPU 51 to display elements on the operating panel 5, main motor M1, developing motor M2, electrostatic charger 12, transfer charger 15, clutches CL3, CL4, CL5 of the feed roller, clutch CL6 of the timing roller, scanning clutch CL1 and returning clutch CL2.

The controlling apparatus 3 is controlled by MPU41. To MPU41 are inputted signals from the operating button switch 35, a read/write unit 37a, a printer 39 and RAM42 backed up by a battery 42a. Moreover, MPU41 outputs signals to the display unit 31, read/write unit 37a, printer 39 and RAM42.

CPU51 and MPU41 are connected to each other to carry out various kinds of processes which will be depicted later. CPU51 and MPU41 can communicate with each other through interruption.

<Process at the side of controlling apparatus>

The process executed in MPU41 of the controlling apparatus 3 will now be described with reference to FIGS. 6 through 12.

MPU41 is turned ON, for example, when it is connected to the copying machine 1. At the starting step S501, initialization is conducted.

It is detected at step S511 whether the switch SW1 is in the OFF state. If the switch SW1 is kept ON, the flow skips to step S585, wherein "ERROR" is indicated at the display part 31b.

On the other hand, if the switch SW1 is detected OFF at step S511, the display part 31b displays "CARD" at step S513, urging the operator to insert the magnetic card 7.

When the magnetic card 7 is started to be inserted, step S515 flows to step S517, wherein the data stored in the magnetic card 7 is read by the head 37. Reading of the data is continued until the magnetic card 7 is completely inserted. Upon completion of the insertion, step S519 flows to one of steps S521, S541 and S561 to detect the kind of the magnetic card 7. The process described below is started from each step.

i) in the case of E-card

When the magnetic card 7 is E-card, the flow proceeds from step S521 to step S601 of FIG. 7, to carry out a further process as follows.

That is, at step S601, the element number of the inserted E-card is indicated at the display part 31a, and the copying number of the element is read from RAM42, displayed at the display part 31b. Then, the controlling apparatus 3 is held standby waiting for a push of the operating switch 35.

Subsequently, when the button switch 35 is pressed (S611;YES) and as long as the button switch 35 is being pressed down (S621;YES), the element number is indicated at the display part 31a. Moreover, the copying number of the element per every size of the papers is read out from RAM42 and sequentially indicated with a predetermined constant time interval (S623→S625;NO→S623→ ... ). If the button switch 35 is turned OFF (S625;YES), on condition that the magnetic card 7 is not taken out (S631;NO), the flow returns to step S611, whereby the controlling apparatus is turned again to wait for depression of the button switch 35. At this time, the display part 31b displays the copying number of the sheets and papers of the size indicated at the time when the button switch 35 is turned OFF (S629).

When the magnetic card 7 is started to be taken out to turn OFF the switch SW2 (S631;YES), the display part 31b displays "CARD" (S581). After the magnetic card 7 is completely pulled out, with the switch SW1 turned OFF (S583;YES), the flow returns to step S513 shown in FIG. 6. The controlling apparatus 3 is again in the waiting state for insertion of the magnetic card.

ii) in the case of T-card

Figure 8:
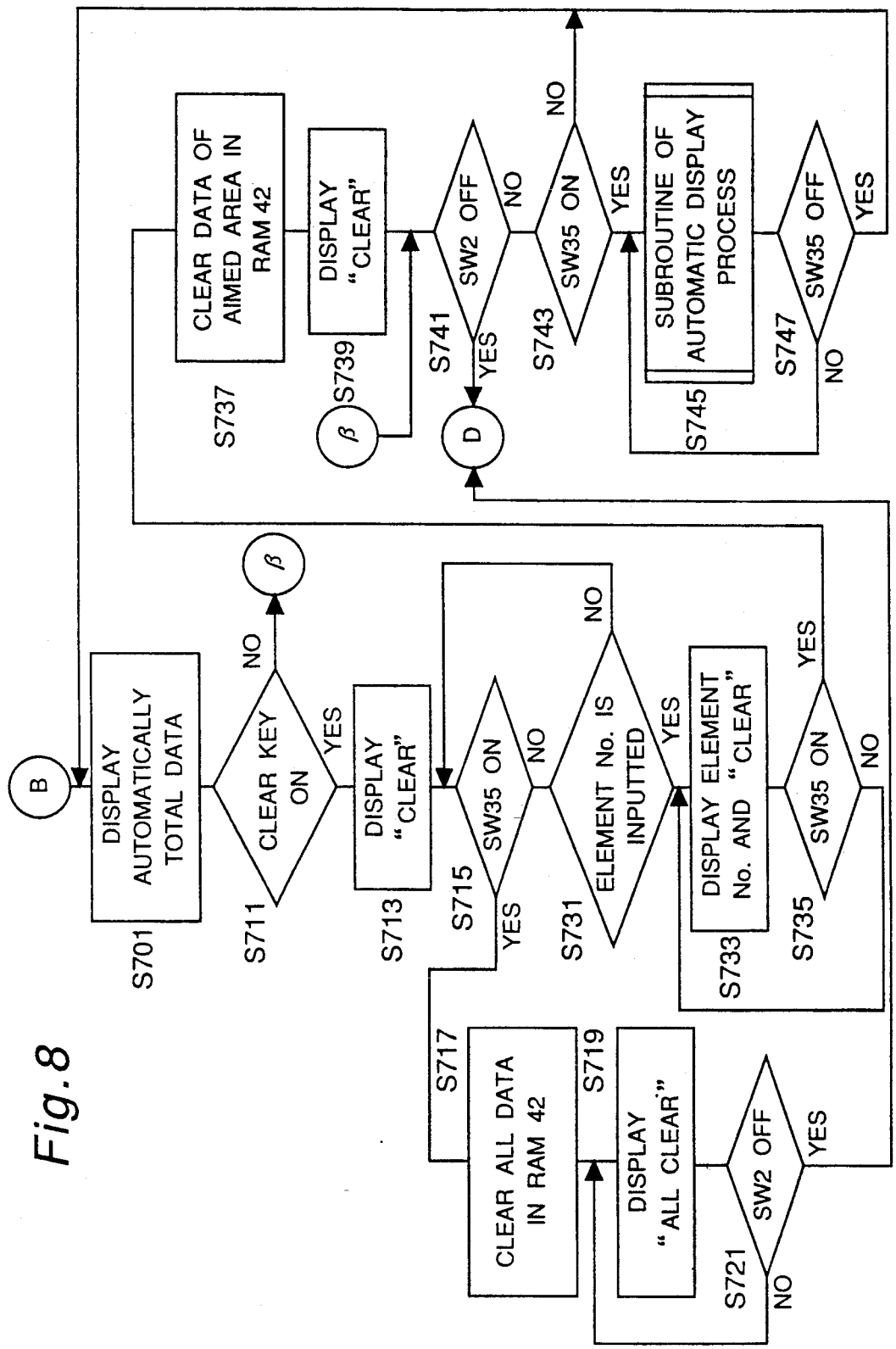

In the case where the magnetic card 7 inserted into the controlling apparatus 3 is T-card, step S541 is moved to step S701 shown in FIG. 8, and the following process is started.

In the first place, the total data is automatically displayed at the display unit 31 at step S701. That is, the total copying number of the copying machine 1 and the copying number of each element per every size of papers are sequentially indicated with a predetermined constant time interval.

In the state as above, if an input from a clear key of the copying machine 1 or the button switch 35 of the controlling apparatus 3 is tried, the flow advances to a step corresponding to the input.

Figure 9:
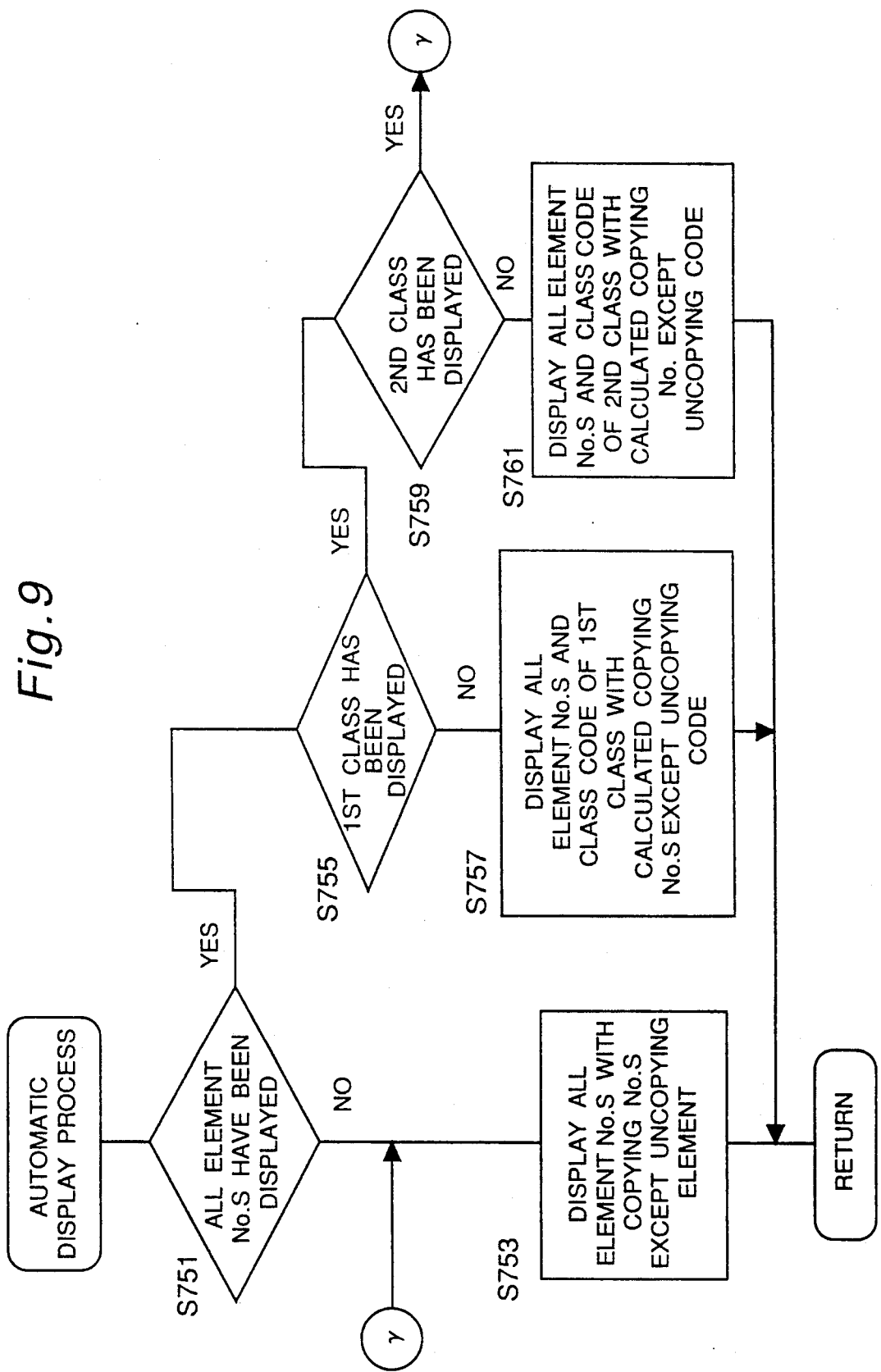

For example, when the button switch 35 is depressed (S743;YES), the flow moves to step S745 to carry out a sub routine, i.e., automatic display process shown in FIG. 9.

At step S753, both the element number and the copying number of each element of the first to 99th elements are sequentially displayed with a predetermined fixed time interval. The element number is indicated at the display part 31a, and the copying number of each element is shown at the display part 31b.

After each copying number of all the elements (first to 99th elements in the present embodiment) is indicated (S751;YES), a class code representing each group of all the groups (each group consisting of elements designated by the same numerical code) classified according to the first class (first classification) and the sum of the copying numbers of the elements included in the subject group are sequentially displayed a predetermined time interval (S757). The class and class code are indicated by the display part 31a, while the sum of the copying numbers of the elements included in the group corresponding to the class code is indicated at the display part 31b.

By way of example, in the case where the copying number of each element of the first to fifth elements is counted and stored as shown in Table 1 below, and at the same time, the class codes of the first and second classes are set as in Table 1, the class (that is, which of the first class and second class is the classification) is indicated at the highest digit of the display part 31a, and the class code is displayed at the second and third digits of the display part 31a, as is shown in the lower half of Table 2 below. At the display part 31b, the sum of the copying numbers of the elements included in each group corresponding to the respective class code is indicated. As described before, only the element numbers are shown at the display part 31a in the upper half of Table 2 depicting the result at step S753.

When the copying numbers of all the groups classified according to the first class are finished to be displayed (S755;YES), then, the class code representing each group of all the groups classified according to the second class and the sum of the copying numbers of the elements included in the aimed group are sequentially displayed with a predetermined time interval (S761), similar to the above case of the first class. The display at step S761 is shown in the lower two rows of Table 2.

When the copying numbers of all the groups classified according to the second class are completely displayed (S759;YES), step S753 comes back. The above sequence of procedures is repeatedly carried out.

TABLE 1

| Element No. | Copying No. | First class | Second class |
| --- | --- | --- | --- |
| 1 | 105 | 1 | 1 |
| 2 | 26 | 1 | 1 |
| 3 | 1234 | 2 | 2 |
| 4 | 8 | 2 | 2 |
| 5 | 10 | 3 | 2 |

TABLE 2

| Display part 31a | | Display part 31b |
| --- | --- | --- |
| Element No. | Class and Class code | Copying No. |
| 1 | | 105 |
| 2 | | 26 |
| 3 | | 1234 |
| 4 | | 8 |
| 5 | | 10 |
| | 101 | 131 |
| | 102 | 1242 |
| | 103 | 10 |
| | 201 | 131 |
| | 202 | 1252 |

This automatic display process is terminated when the button switch 35 is released from the state being continuously depressed (S747;YES). Afterwards, the flow returns to step S701.

In the middle of the procedure at step S701, if the clear key of the copying machine 1 is turned ON, with the fact being transmitted from CPU51 (S711;YES), the display part 31b makes a display "CLEAR" (S713). In other words, the operator is informed of the fact that a mode to clear RAM42 is set.

If the switch 35 is pressed down in the above state (S715;YES), all the data stored in RAM42 is cleared (S717). At the same time, "ALL CLEAR" is indicated at the display unit 31 (S719).

While the mode to clear RAM42 is set (S715;NO→S731;NO→S715;NO→ ... ), if data of numerical values expressing the element number is fed from CPU51 through manipulation of the ten key of the copying machine 1 (S731;YES), the element number is indicated at the display part 31a, and moreover "CLEAR" is displayed at the display part 31b (S733). It is accordingly noticed to the operator that a mode to clear the data of the element the number of which is indicated is set.

When the switch 35 is pressed in the state as above (S735;YES), the data of the group having the number thereof indicated is cleared (S737). Moreover, "CLEAR" is continuously displayed at the display part 31b (S739).

Figure 6:
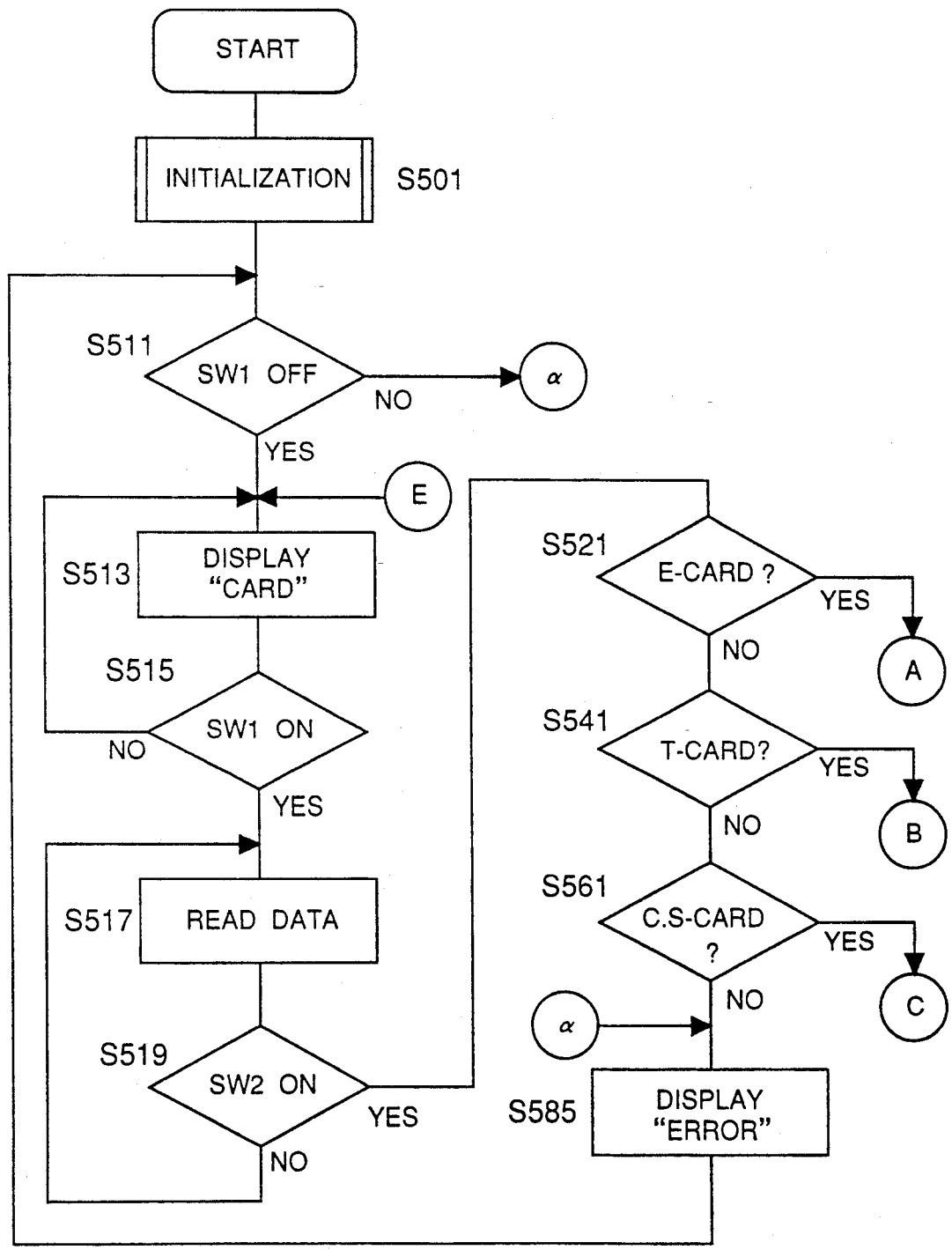
FIGS. 6–10 are flow charts showing a main routine of the process in a controlling MPU of the controlling apparatus of copying machine.
Figure 7:
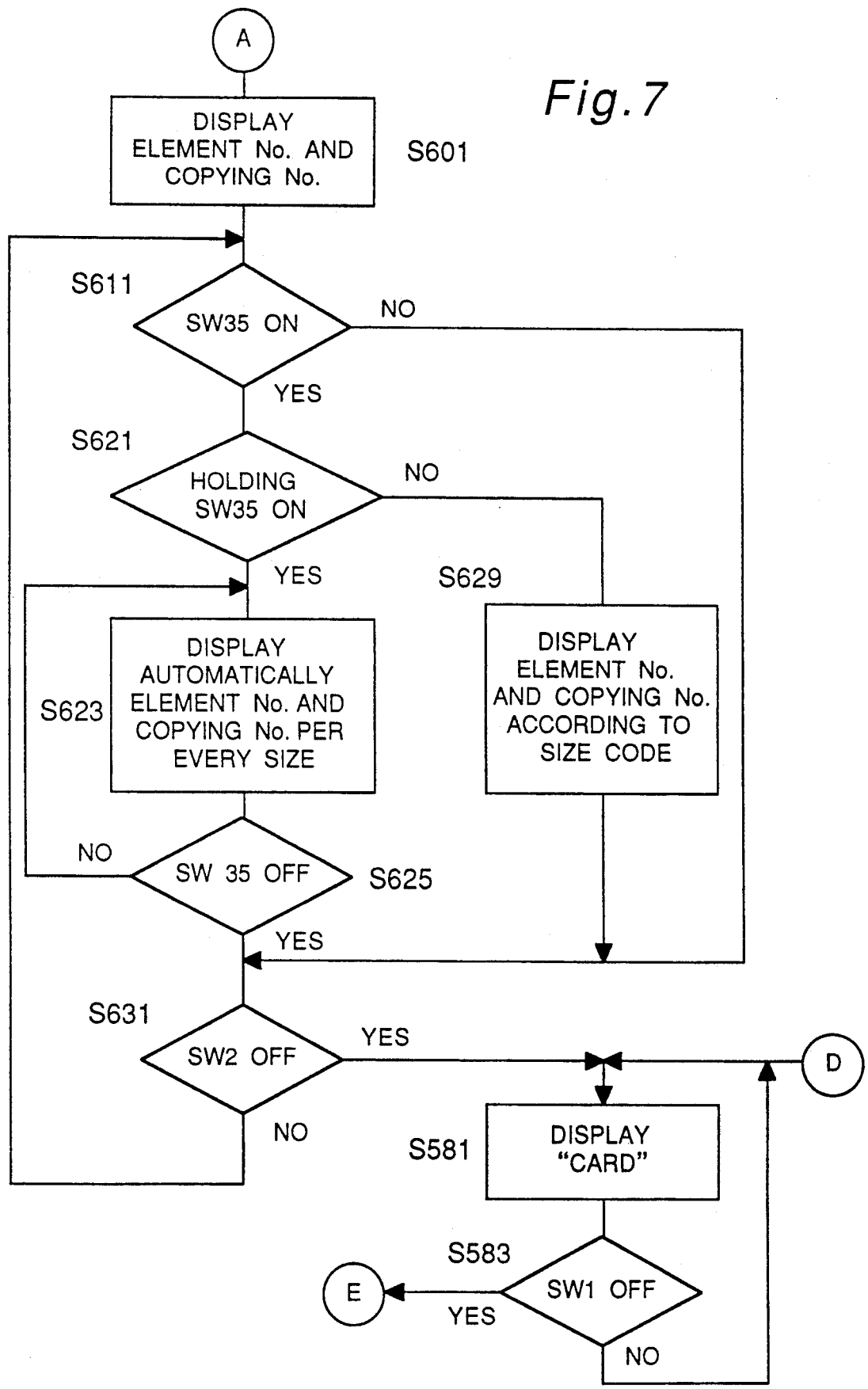

During the display-at step S719, S739 or S701, if the switch SW2 is turned OFF as the magnetic card 7 is pulled out (S721;YES, or S741;YES), the flow proceeds to step S581 of FIG. 7. In consequence, "CARD" is displayed at the display part 31b. Thereafter, when the magnetic card 7 is perfectly pulled out (S583;YES), the flow returns to step S513 shown in FIG. 6.

iii) in the case of C.S-card

Figure 10:
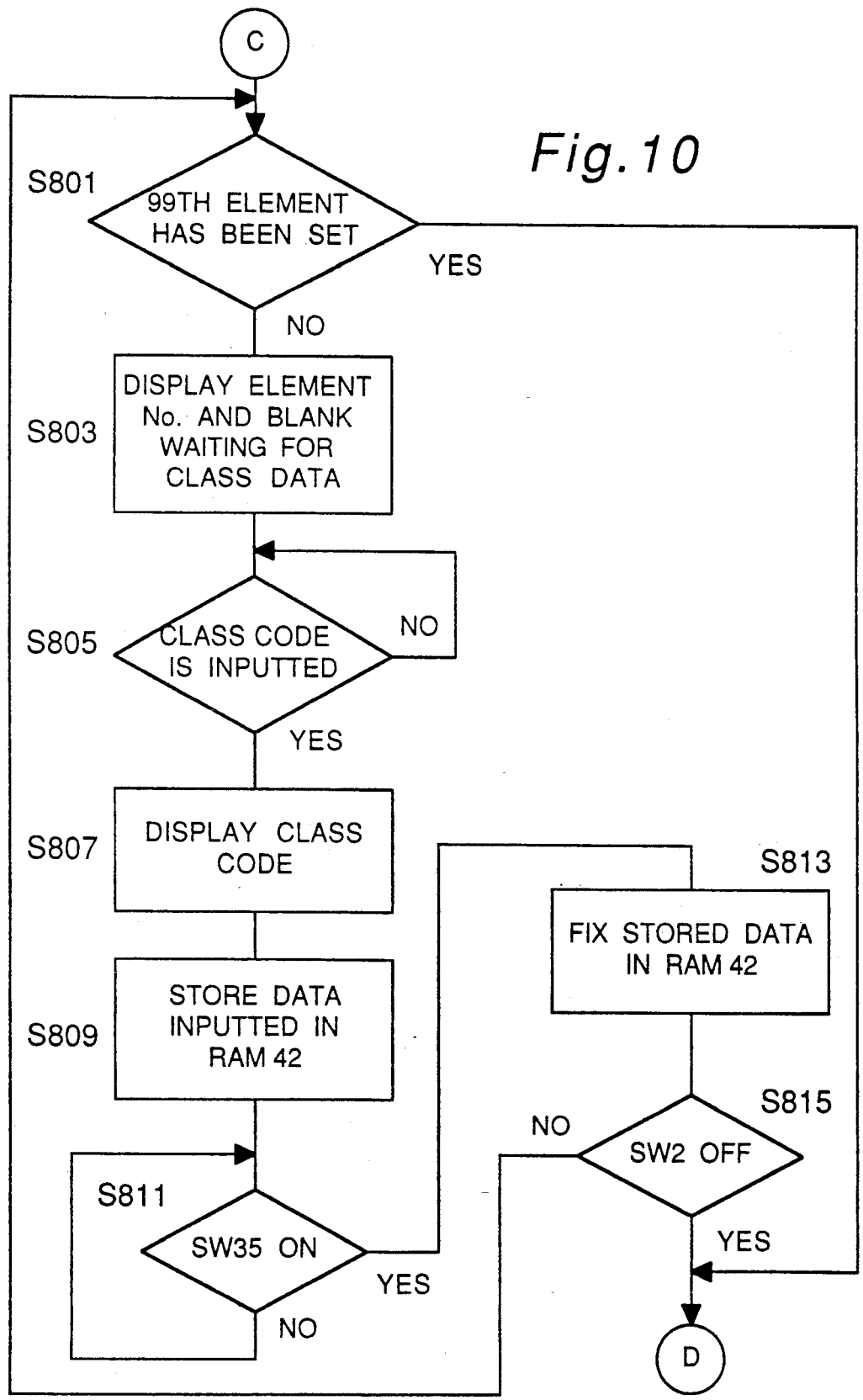

When the inserted magnetic card 7 is C.S-card (S561;YES), the process of FIG. 10 is performed.

Specifically, so long as an element the class data of which is not completely set (S801;NO) is present, steps S803-S813 are processed, whereby the class data of the element is set for each class one by one.

Figure 12A:
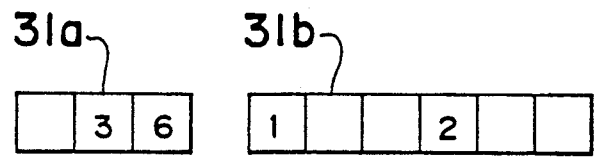
FIGS. 12A and 12B are diagrams of how to input and display class data of an element.
Figure 12B:
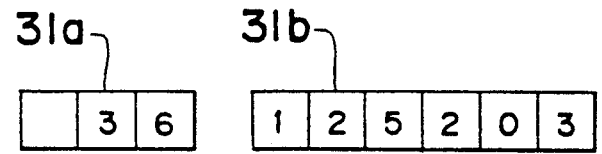
Figure 13:
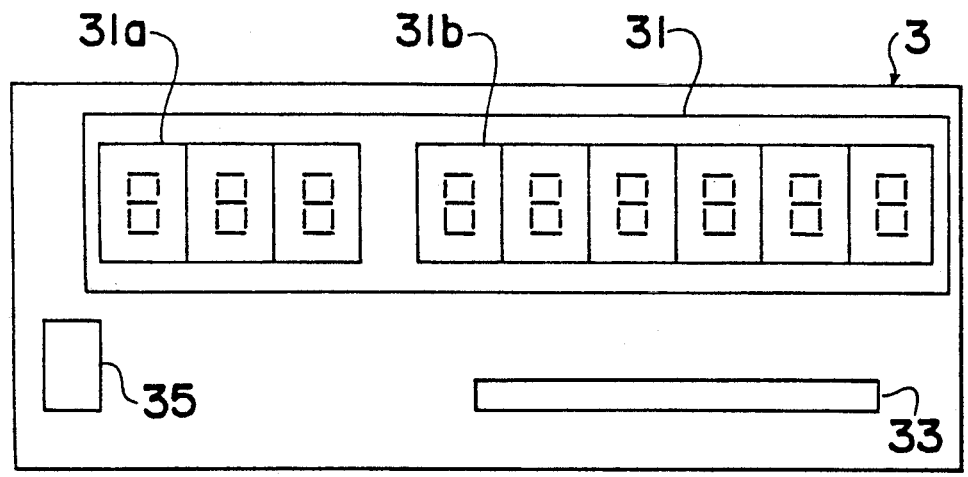
FIG. 13 is a front elevational view of the controlling apparatus of copying machine.

For instance, if the class data of the 36th element is not yet set, as indicated in FIG. 12, the element number, i.e., "36" is indicated at the display part 31a at step S803. Moreover, "1" standing for the first class is indicated at the uppermost digit of the display part 31b. The second and third digits of the display part 31b are rendered blank to wait for the class data of the first class to be inputted. Likewise, "2" representing the second class is shown at the fourth digit of the display part 31b, while the fifth and sixth digits are made blank so that the class data of the second class be inputted.

In the above state, when "2", "5", "0", "3" representing the class data are inputted through the ten key of the copying machine and transmitted from CPU51 (S805;YES), the numerical data are displayed at the second and third, and fifth and sixth digits of the display part 31b as indicated in the lower half of FIG. 12 (S807). At the same time, the data is temporarily stored in RAM42 (S809). When the switch 35 is depressed afterwards (S811;YES), the data is finally fixed in RAM42 (S813), so that the data is not unintentionally changeable.

Also in the case where the inserted magnetic card 7 is C.S-card, when the magnetic card 7 is started to be pulled out thereby to turn OFF the switch SW2 (S815;YES), the flow moves to step S581 of FIG. 7 and further to step S513 of FIG. 6. The process described before is conducted.

iv) Interruption process

Figure 11:
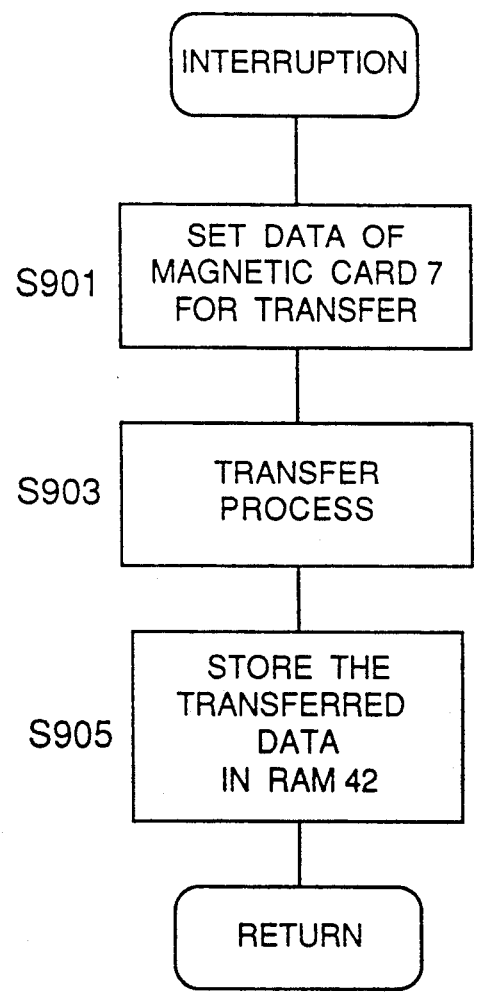
FIG. 11 is a flow chart of the process executed in the MPU consequent to the interruption from a CPU of the copying machine.

FIG. 11 is a flow chart of the process to be carried out when an interruption is instructed from CPU51.

More specifically, when an interruption is generated from CPU51, data read from the magnetic card 7 is coded and set in a register for transfer (S901). Thereafter, the coded data is transferred to CPU51 (S903), which is stored in a predetermined area within RAM42 (S905).

<Process at the copying machine>

Figure 15:
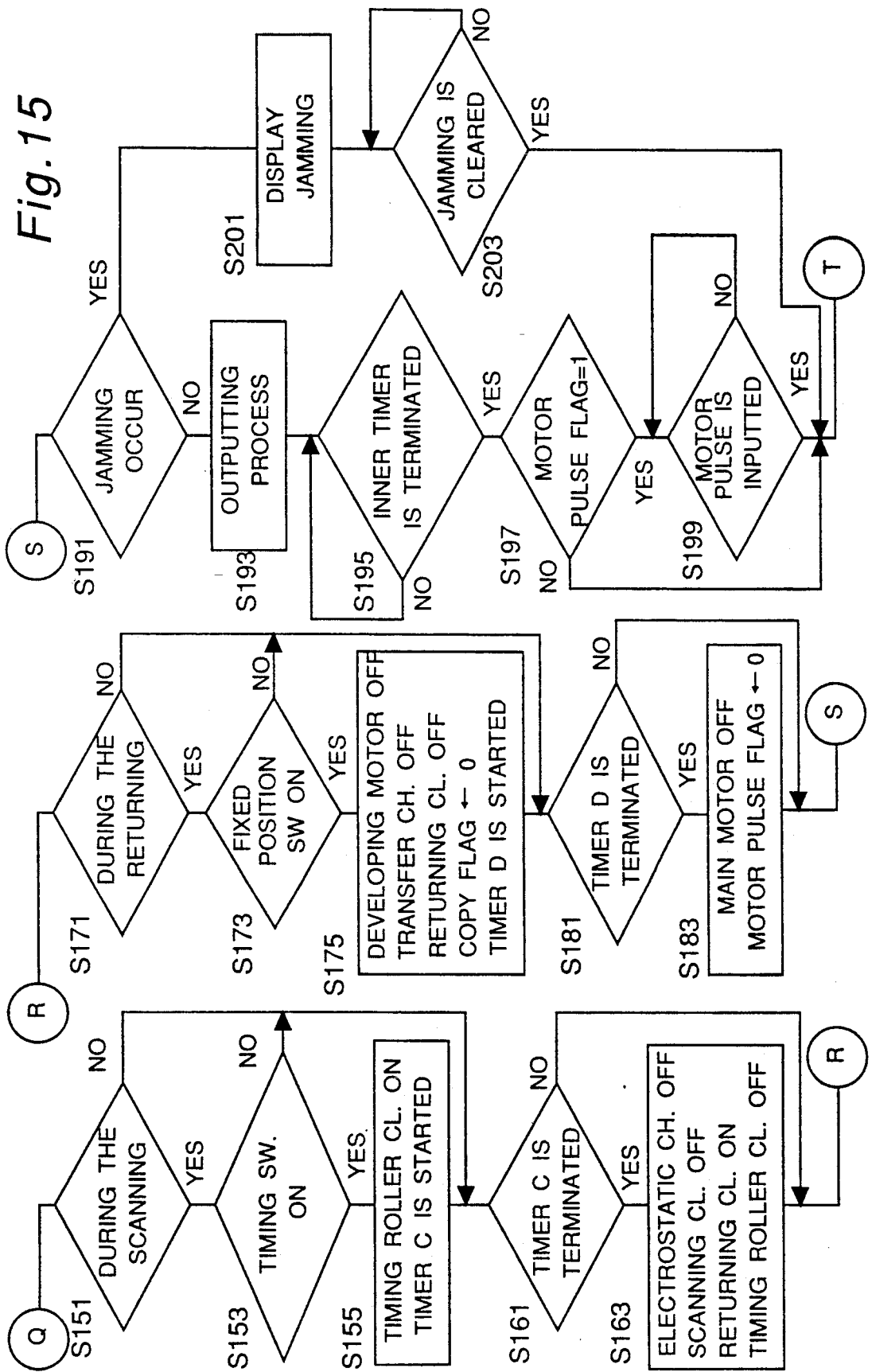

Now, the process executed in CPU51 of the copying machine 1 will be described with reference to FIGS. 14-16.

CPU51 is started to be driven, for example, by supply of power. Initialization is carried out first (S101).

An inner timer is started to control the practicing time of one routine (S103), and various key switches on the operating panel 5 and various switches, sensors within the main body of the copying machine are manipulated to input signals (S105).

In this case, if any of the ten key for inputting numerical values are depressed (S111;YES), it is detected from a signal from MPU41 whether the C.S-card is inserted in the controlling apparatus 3.

If the C.S-card is inserted (S113;YES), the numerical data input through the ten key is set as the class data to be transmitted to MPU41 (S117). On the contrary, without the C.S-card inserted (S113;NO), the numerical data is set as the data of the desired copying number to be displayed on the operating panel of the copying machine (S115).

Meanwhile, when a signal indicating that the E-card is inserted into the controlling apparatus 3 is transmitted from MPU41 (S121;YES), a copying number increment signal to be transmitted to the counter is set to "1" (S125) if the print key (key switch to start copying) on the operating panel 5 is manipulated so that the key switch turns ON(S123;YES). Simultaneously, the main motor M1, developing motor M2, electrostatic charger 12, transfer charger 15 and paper feed clutch (either of clutches CL3-CL5) are turned ON, and a copy flag is set to "1". Moreover, controlling timers A and B are started (S127).

When the timer A is terminated (S131;YES), the increment signal is reset to "0" (S133). The copying number is increased one at a trailing edge of the increment signal. The selected paper feed clutch (either of clutches CL3-CL5) is turned OFF (S135).

Further, at the terminating timing of the timer B (S141,YES), the scanning clutch CL1 is driven to start exposure and scanning, and a motor pulse flag is set to "1", whereby copying which is synchronously performed with the rotation of the main motor M1 is started to be controlled (S143).

Subsequently, the scanning body is moved while the exposure and scanning of the optical system take place(S151;YES), the timing switch SW5 is brought to the ON state by the movement of the scanning body (S153;YES), thereby turning the clutch CL6 of the timing roller 14 ON. As a result, papers are started to be supplied to the transfer section (between the photosensitive drum 11 and transfer charger 15) and a controlling timer C is started (S155).

At the finishing timing of the timer C (S161;YES), both the electrostatic charger 12 and the scanning clutch CL1 are rendered OFF, with the returning clutch CL2 turned ON to allow the scanning body to start returning to the initial position. The clutch CL6 of the timing roller 14 is turned OFF (S163).

Then, when the fixed position switch SW6 is turned ON (S173;YES) as the scanning body is returned (S171;YES), the developing motor M2, transfer charger 15, returning clutch CL2 are turned OFF and the copy flag is reset to "0", and moreover a controlling timer D is started (S175).

Thereafter, the main motor M1 becomes OFF and the motor pulse flag is reset to "0" (S183) when the timer D is finished (S181;YES). Accordingly, the control of synchronous copying with the rotation of the main motor M1 is released.

Step S193 is an outputting process of control signals to various working parts. Step S195 is a step to control the practicing time of one routine of the inner timer (with reference to step S103). Furthermore, steps S197 and S199 are steps to control the practicing time of the above copying control.

In the event a paper jamming occurs during the process (S191;YES), the fact is indicated on the operating panel 5 (S201). Copying control is recovered to normal after the jamming is cleared (S203;YES).

Figure 16:
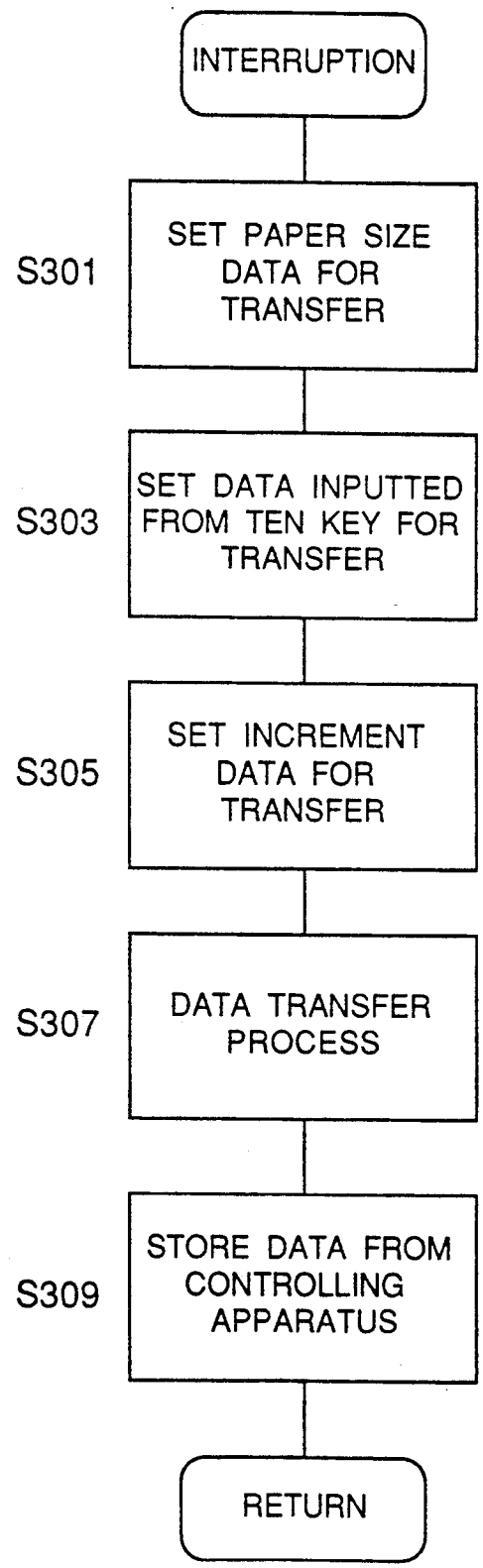
FIG. 16 is a flow chart of the process executed in the CPU consequent to the interruption from the controlling MPU of the controlling apparatus of copying machine.

FIG. 16 shows a flow chart of the process executed when an interruption from MPU41 is brought about.

When an interruption is instructed from MPU41, each of the paper size data, inputting data of the ten key, timing information of the copying number increment signal is coded and set in a register to be transferred to MPU41 (S301-S305). The coded data is transferred thereafter (S307). And, the data transmitted from MPU41 is stored in a predetermined memory area (S309).

In the manner as described hereinabove, the controlling apparatus of the present invention operates to control the copying machine.

According to the controlling apparatus, a class (classification) can be set as desired for each element which is a unit of users of the copying machine, and a class code representing a group in an arbitrary class to which an arbitrary element belongs can be set as desired for each class. Moreover, the copying number obtained by each element belonging to an arbitrary group can be summed and displayed (outputted) by designating the arbitrary group (class code) in an arbitrary class.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A controlling apparatus for controlling data related to the operation of an image forming apparatus, comprising:
   memory means having a plurality of memory areas for storing numerical data related to said image forming apparatus;
   data classifying means for setting classifying data to classify said plurality of memory areas, thereby to divide said plurality of memory areas into an arbitrary number of groups based on said classifying data;
   memory control means for storing said classifying data in a related manner to said numerical data into said memory means; and
   data outputting means for outputting said numerical data stored in said memory means for every group wherein said numerical data is data related to an amount of consumables used in said image forming apparatus.

2. A controlling apparatus as set forth in claim 1, wherein said data classifying means is capable of setting a plurality of kinds of classifying data to each of said memory areas.

3. A controlling apparatus as set forth in claim 1, wherein said numerical data indicates a copying number of papers.

4. A controlling apparatus for controlling data related to the operation of an image forming apparatus, comprising:
   memory means having a plurality of memory areas for storing numerical data related to said image forming apparatus;
   data classifying means for setting classifying data to classify said plurality of memory areas, thereby to divide said plurality of memory areas into an arbitrary number of groups based on said classifying data;
   memory control means for storing said classifying data in a related manner to said numerical data into said memory means; and
   data outputting means for outputting said numerical data stored in said memory means for every group, wherein said data outputting means sums and outputs the numerical data stored in said memory means per every group.

5. A controlling apparatus as set forth in claim 4, wherein said numerical data indicates a copying number of papers.

6. A controlling apparatus for controlling data related to an operation of an image forming apparatus, comprising:
   memory means having a plurality of memory areas for storing numerical data related to said image forming apparatus;
   data classifying means for setting classifying data to classify said plurality of memory areas, and dividing said plurality of memory areas into an arbitrary number of groups based on said classifying data;
   memory control means for storing said classifying data in a related manner to said numerical data into said memory means;
   data outputting means for outputting said numerical data stored in said memory means for every group;
   designating means for designating one of said memory areas; and
   erasing means for erasing the numerical data stored in the designated memory area in the memory means, wherein said numerical data is data related to an amount of consumables used in said image forming apparatus.

7. A controlling apparatus as set forth in claim 6, further comprising:
   control means for controlling said data classifying means so that said classifying data according to said data classifying means is able to be set only in a memory area wherein said classifying data is not set.

8. An image forming apparatus provided with a controlling apparatus for controlling data related to an operation of said image forming apparatus, wherein said controlling apparatus being provided with:
   memory means having a plurality of memory areas for storing numerical data related to a using amount of consumables used in said image forming apparatus,
   said memory area being allotted to each user permitted to use said image forming apparatus;
   inputting means for inputting discriminating data to discriminate users using said image forming apparatus;
   permitting means for permitting said image forming apparatus to operate when the discriminating data input by said inputting means is suitable;
   data write means for storing said numerical data into said memory area corresponding to the user whose discriminating data is inputted;
   data classifying means for setting classifying data for each of said plurality of memory areas and dividing said plurality of memory areas into groups;

memory control means for storing said classifying data in a related manner to said numerical data into said memory means; and data outputting means for outputting numerical data stored in said memory means for every group.

9. An image forming apparatus as set forth in claim 8, wherein said inputting means is provided with:

data holding medium which is detachable from said controlling apparatus and possessed by each user for holding said discriminating data different for each user; and data read means for reading said discriminating data held by said data holding means mounted in said controlling apparatus.

10. An image forming apparatus as set forth in claim 8, wherein said data write means adds fresh numerical data to numerical data already stored in a memory area and writes a resulting sum into said memory area.

11. A controlling apparatus as set forth in claim 3, further comprising:

discriminating means for discriminating per every group whether the numerical data is stored in each of said plurality of memory areas; and display control means for controlling said display means to display numerical data of a group which is discriminated by said discriminating means to store the numerical data.

12. A controlling apparatus for controlling data related to an operation of an image forming apparatus, comprising:

memory means having a plurality of memory areas for storing a copying number of papers, said memory area being allotted to a user permitted to use said image forming apparatus;

data classifying means for setting classifying data to classify said plurality of memory areas and dividing said plurality of memory areas into an arbitrary number of groups based on said classifying data;

memory control means for storing said classifying data in a related manner to said numerical data into said memory means; and summing means for summing the copying number of papers per every group based on a content of said memory control means;

display means for displaying a summing result of said summing means.

13. A controlling apparatus as set forth in claim 12, wherein said display means sequentially displays the summing result of each group with a predetermined time interval.

14. A controlling apparatus for controlling an image forming apparatus, comprising:

receiving means for receiving numerical data sent from the image forming apparatus;

memory means having a plurality of memory areas for storing said numerical data;

first data input means for inputting a first data which designates one of said memory areas;

first memory control means for storing said numerical data sent from the image forming apparatus into said one memory area designated by said first data;

second data input means for inputting a second data which classifies said memory areas into an arbitrary number of groups based on the second data; and data output means for outputting the numerical data stored in the memory areas belonging to one of said groups classified by said second data.

15. The control apparatus as claimed in claim 14, wherein said memory means stores said second data.

16. The control apparatus as claimed in claim 15, further comprising:

third input means for inputting a third data for initiating an operation of said data output means.

17. The control apparatus as claimed in claim 16, wherein said first input means includes a first card device which is attachable to and detachable from the control apparatus.

18. The control apparatus as claimed in claim 16, wherein said second input means includes a second card device which is attachable to and detachable from the control apparatus.

19. The control apparatus as claimed in claim 16, wherein said third input means includes a third card device which is attachable to and detachable from the control apparatus.

20. The control apparatus as claimed in claim 14, wherein said data output means sums and outputs the numerical data stored in the memory areas belonging to one of said groups classified by said second data.

21. The control apparatus as claimed in claim 14, wherein said numerical data is data related to an amount of consumables used in said image forming apparatus.

22. A controlling apparatus for controlling an image forming apparatus, comprising:

receiving means for receiving numerical data sent from the image forming apparatus;

memory means having a plurality of memory areas for storing said numerical data;

a first input device which inputs a first command;

a second input device which inputs a second command;

a third input device which inputs a third command; and a controller which executes a first program in response to the first command, a second program in response to the second command, and a third program in response to the third command, wherein said controller identifies an operator of the image forming apparatus and allows the operator to use the image forming apparatus and stores the numerical data into one of said memory areas corresponding to the identified operator in the first program, said controller sets a data outputting format in the second program, and said controller outputs the numerical data stored in the one of said memory areas in accordance with the data outputting format.

23. The controlling apparatus as claimed in claim 22, wherein said first input device includes a card device which stores the first command and a card reader which reads the first command stored in the card device.

24. The controlling apparatus as claimed in claim 22, wherein said second input device includes a card device which stores the second command and a card reader which reads the second command stored in the card device.

25. The controlling apparatus as claimed in claim 22, wherein said first input device includes a card device which stores the third command and a card reader which reads the third command stored in the card device.

26. The controlling apparatus as claimed in claim 22, wherein said controller sums and outputs the numerical data stored in said one of the memory areas in accordance with the data outputting format.

27. The controlling apparatus as claimed in claim 22, wherein said numerical data is data related to an amount of consumables used in said image forming apparatus.

* * * * *